United States Patent [19]

Takeuchi

[11] 4,216,603
[45] Aug. 12, 1980

[54] FISHING REEL SEAT

[75] Inventor: Hiroshi Takeuchi, Iruma, Japan

[73] Assignee: Olympic Fishing Tackles Company, Limited, Saitama, Japan

[21] Appl. No.: 948,047

[22] Filed: Oct. 3, 1978

Related U.S. Application Data

[63] Continuation of Ser. No. 782,726, Mar. 30, 1977, abandoned.

[30] Foreign Application Priority Data

Jun. 14, 1976 [JP] Japan ............................. 51-77640[U]

[51] Int. Cl.² ............................................... A01K 87/06
[52] U.S. Cl. .................................... 43/22; 151/16
[58] Field of Search ................. 43/22; 151/16, 17, 18; 85/1 L, 46, 47

[56] References Cited

U.S. PATENT DOCUMENTS

| 514,315 | 2/1894 | Frenot | 151/16 |
|---|---|---|---|
| 647,235 | 4/1900 | Sault | 151/16 |
| 1,537,819 | 5/1925 | Grimm | 151/16 |
| 4,045,902 | 9/1977 | Ohmura | 43/22 |

FOREIGN PATENT DOCUMENTS

| 2539551 | 10/1977 | Fed. Rep. of Germany | 151/16 |
|---|---|---|---|
| 16862 | of 1909 | United Kingdom | 151/16 |
| 183024 | 7/1922 | United Kingdom | 151/16 |

Primary Examiner—Nicholas P. Godici
Assistant Examiner—K. Bradford Adolphson
Attorney, Agent, or Firm—Oblon, Fisher, Spivak, McClelland & Maier

[57] ABSTRACT

Disclosed is a fishing reel seat of the type adapted to attach a fishing reel to a fishing pole and having a stationary ring and a moveable ring adapted to receive the two tangs of the fishing reel. Compound screw threads are formed around the circumference of the main body of the seat for engagement with two locking nuts with threads of opposite hand. The compound thread on the body permits the locking nuts to be tightened against each other by turning in opposite directions to insure a tight locking engagement.

1 Claim, 5 Drawing Figures

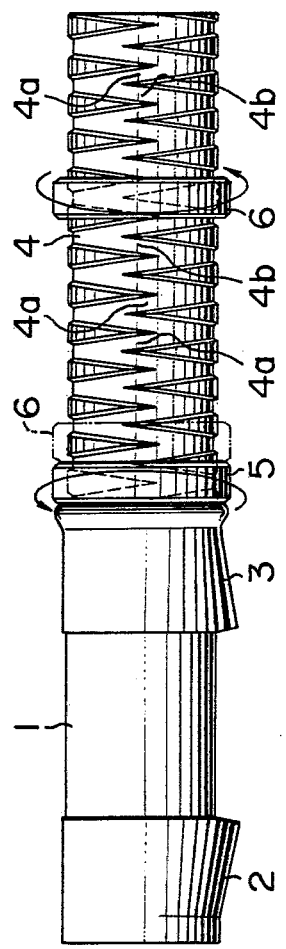
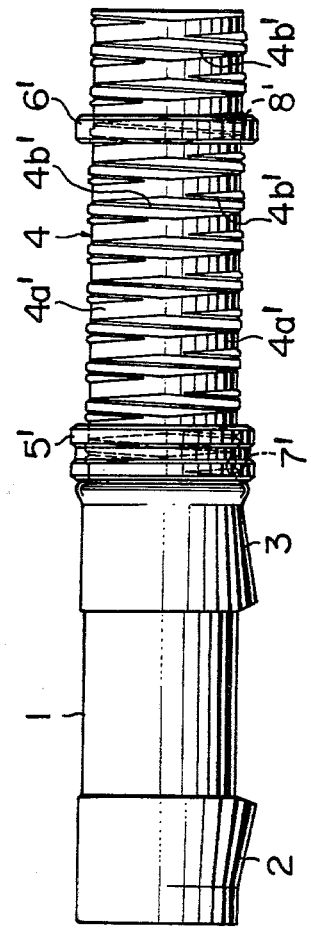

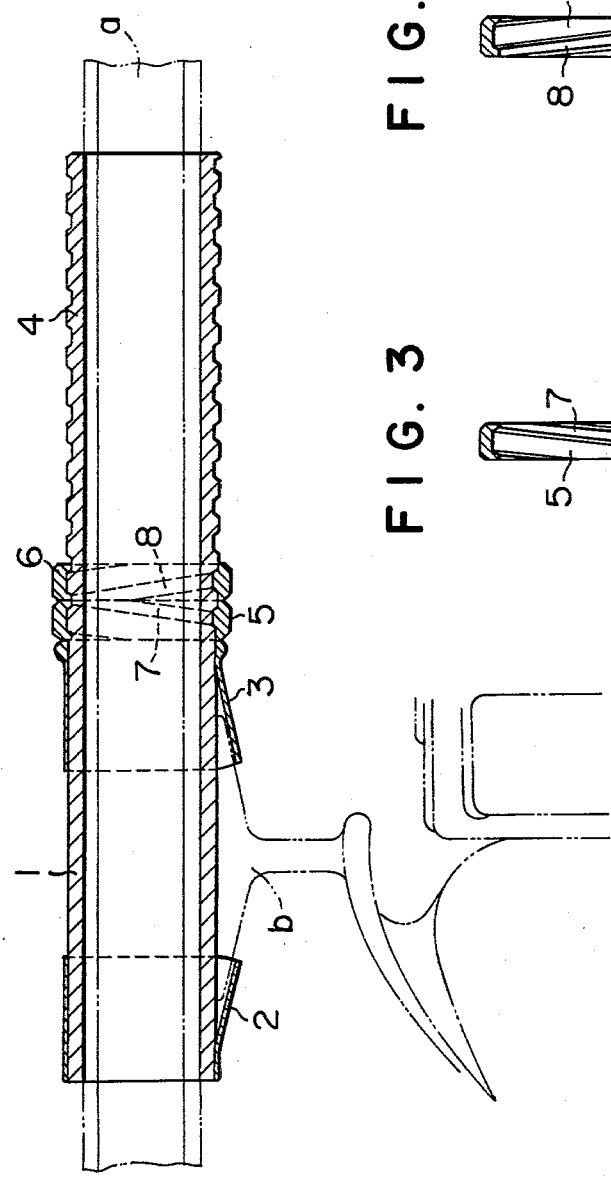

FISHING REEL SEAT

This is a continuation, of application Ser. No. 782,726, filed Mar. 30, 1977, now abandoned.

BACKGROUND OF THE INVENTION

A conventional fishing reel seat of the type adapted to attach a fishing reel to a fishing rod or pole has a stationary ring generally located toward the handle end of the pole and a moveable ring generally located away from the handle end of the pole. These rings generally have a portion distorted out of round to provide a tapered or wedge-shaped void between the ring and the cylindrical body of the seat. Fishing reels generally have two tangs mounted thereon which are adapted to be received in the aforementioned voids, and the reel is rigidly secured to the pole by longitudinally moving the moveable ring along the length of the pole toward the stationary ring, and then locking the moveable ring in place by means of locking nuts. These locking nuts have interior threads of like hand and pitch which engage with mating exterior threads formed around the cylindrical body of the reel seat. The first nut is tightened against the moveable ring and the second nut is then rotated in the same direction and tightened against the first nut.

The major problem with such a structure is that continued use of the fishing pole and reel tends to loosen the locking nuts with resultant unsteadiness of the reel. The nuts tend to loosen since they are both threaded in the same direction, or with the same hand, and thus turning in only one direction tends to loosen them both.

SUMMARY OF THE INVENTION

In accordance with the present invention, the interior screw threads of the two locking nuts are of opposite hand from each other, and the exterior screw thread formed around the cylindrical body of the reel seat is a compound thread with both a right and left hand helix. In this manner, the first locking nut can be turned in a given direction and tightened down against the moveable ring, and then the second locking nut can be turned in the other direction to tighten against the first locking nut.

This arrangement is far more effective in assuring that the locking nuts will remain tight and be more resistant to loosening from vibration and stress.

The compound thread on the body of the reel seat may be formed in several variations. For example, the pitch, tooth height, root width, etc. of the threads may be the same despite the opposite hand of the two sets of threads, or, alternatively, the thread of one hand may be relatively coarse and the thread of the other hand may be cut into the tooth crown of the first thread but be relatively fine. For example, the coarse thread (faster pitch) can be for the nut which engages the moveable ring, thus enabling this locking nut to be quickly threaded against the moveable ring.

BRIEF DESCRIPTION OF THE DRAWINGS

A more complete appreciation of the invention and many of the attendant advantages thereof will be readily attained as the same becomes better understood by reference to the following detailed description when considered in connection with the accompanying drawings, wherein:

FIG. 1 is a front view of the reel seat of the present invention.

FIG. 2 is a cross-sectional longitudinal view of the reel seat, with portions of the rod and reel shown in phantom lines.

FIG. 3 is a cross-sectional view of the first locking nut.

FIG. 4 is a cross-sectional view of the second locking nut.

FIG. 5 is a front view of another embodiment of the present invention showing a different compound thread formation one of the threads is formed on the crests of the other thread.

DESCRIPTION OF THE PREFERRED EMBODIMENTS

The reel seat of the present invention consists of hollow cylindrical body 1, having both ends open so that it can accommodate fishing rod a (FIG. 2). Stationary ring 2 is fixedly secured to the circumference of one end of body 1 while moveable ring 3 is movably fitted over the other end of body 1. Compound thread 4 is formed over approximately one half the exterior of main body 1.

Both the stationary and moveable rings have a portion distorted out of round to provide a tapered or wedge-shaped void between the ring and the cylindrical body of the seat. These voids are best visible in FIG. 2, and are designed to accommodate the two tangs that protrude from leg b to the reel.

After the reel is secured between the rings, it is necessary to secure moveable ring 3 in place to securely grip the reel. First lock nut 5 and second lock nut 6 are threaded onto compound thread 4, and as is apparent from FIGS. 3 and 4, the thread 7 inside lock nut 5 is a right hand thread and the thread 8 inside lock nut 6 is a left hand thread.

Compound thread 4 is formed on the exterior of body 1 by casting or cutting a right hand thread 4a and similarly forming a left hand thread 4b. The threads in the embodiment of FIG. 1 are of the same pitch and size and complementarily mate with threads 7 and 8 inside lock nuts 5 and 6.

As indicated by arrows in FIG. 1, turning nut 5 in a right hand fashion will advance nut 5 against ring 3, and turning nut 6 in a left hand fashion will advance nut 6 against nut 5. Due to the opposite directions of turning, the resistance to loosening of the ring 3 and two lock nuts 5 and 6 is much greater than when compared to a seat reel having lock nuts threaded in the same direction. Furthermore, since the clamping action in the present invention relies upon rotation of the locking nuts in opposite directions, much less manual effort in tightening the locking nuts is required.

Another embodiment of the present invention is visible in FIG. 5 wherein the pitch of right hand thread 4a' is differentiated from the pitch of the left hand thread 4b', and the width of the thread root of thread 4a' is formed wider than the width of the thread root of thread 4b'. Locking nuts 5' and 6' have corresponding threads 7' and 8', respectively formed therein. One additional advantage of this embodiment is that locking nut 5' may be larger, with corresponding greater strength for heavy fishing tackle such as deep sea tackle. Lock nut 6', which engages thread 4b', is smaller than nut 5' but greater size is not required since its function is merely to lock nut 5' in place.

Having now fully described the invention, it will be apparent to one of ordinary skill in the art that many changes and modifications can be made thereto without departing from the spirit or scope of the invention as set forth herein.

What is claimed as new and desired to be secured by Letters Patent of the United States is:

1. A fishing tackle reel seat comprising:
   a hollow, cylindrical main body;
   a stationary ring and a moveable ring mounted on said body and having means thereon to grip a fishing reel;
   first and second locking nuts for locking said movable ring in engagement with said reel, wherein said first locking nut is mounted on said body between said movable ring and said second locking nut, and said first locking nut is larger than said second locking nut;
   screw thread means formed on the circumferential surface of said body for engagement by said locking nuts;
   said screw thread means being a compound thread having a right hand thread and a left hand thread superimposed upon each other, wherein said right hand thread has a different pitch and root width than said left hand thread, the thread root of said right hand thread being wider than the width of said left hand thread and wherein one of said right hand and left hand threads is both discontinuous and completely formed on the crest of the other of said right hand and left hand threads; and
   one of said locking nuts having interior, mating right hand threads, and the other said locking nut having interior, mating left hand threads, the threads on said first locking nut and the corresponding threads on the body having a faster pitch than the threads on the second locking nut,
   whereby said locking nuts are tightened against said moveable ring in opposite directions, said first locking nut being quickly moveable into engagement with said moveable ring because of said faster thread pitch.

* * * * *